July 18, 1950 E. W. ERNST 2,515,203

TRACKING MECHANISM FOR REFLEX VELOCITY MODULATED TUBES

Filed Jan. 17, 1946

INVENTOR.
EDWARD W. ERNST

BY

ATTORNEYS

Patented July 18, 1950

2,515,203

UNITED STATES PATENT OFFICE 2,515,203

TRACKING MECHANISM FOR REFLEX VELOCITY MODULATED TUBES

Edward W. Ernst, Dayton, Ohio

Application January 17, 1946, Serial No. 641,856

8 Claims. (Cl. 250—36)

(Granted under the act of March 3, 1883, as amended April 30, 1928; 370 O. G. 757)

The invention described herein may be manufactured and used by or for the Government for governmental purposes without payment to me of any royalty thereon.

This invention relates to tuning of reflex velocity modulated tubes and more particularly to a means for simplifying the tuning operation.

A reflex velocity modulated tube of the type commonly referred to as a reflex Klystron comprises a cathode, a reflector, and a plurality of resonator grids. A resonant chamber is associated with the tube to permit the tuning of the frequency of oscillation of the tube to any desired frequency. In the operation of this type of tube, the frequency at which the tube oscillates is a function of both the tuning of the resonant cavity and the potential on the reflector. In present reflex Klystron operation it is necessary to make each adjustment separately, and when adjusting the reflector voltage a power meter is usually used to indicate maximum oscillation. However, for certain positions of the resonant cavity tuner, maximum oscillation does not occur at the desired frequency but at some different frequency mode. This necessitates the use of a wave meter to check the frequency after the resonant cavity has been tuned and the reflector potential adjusted.

Accordingly, an object is to provide improved means for tuning a reflex Klystron type of tube.

Another object is to provide means whereby the steps and checks used in tuning a reflex Klystron are eliminated and the reflector potential control is coupled to the resonant cavity adjustment to permit single dial control of the frequency of operation.

This invention will be more fully understood when considered in conjunction with the accompanying drawings, in which.

Figures 1, 2, 3, 4:
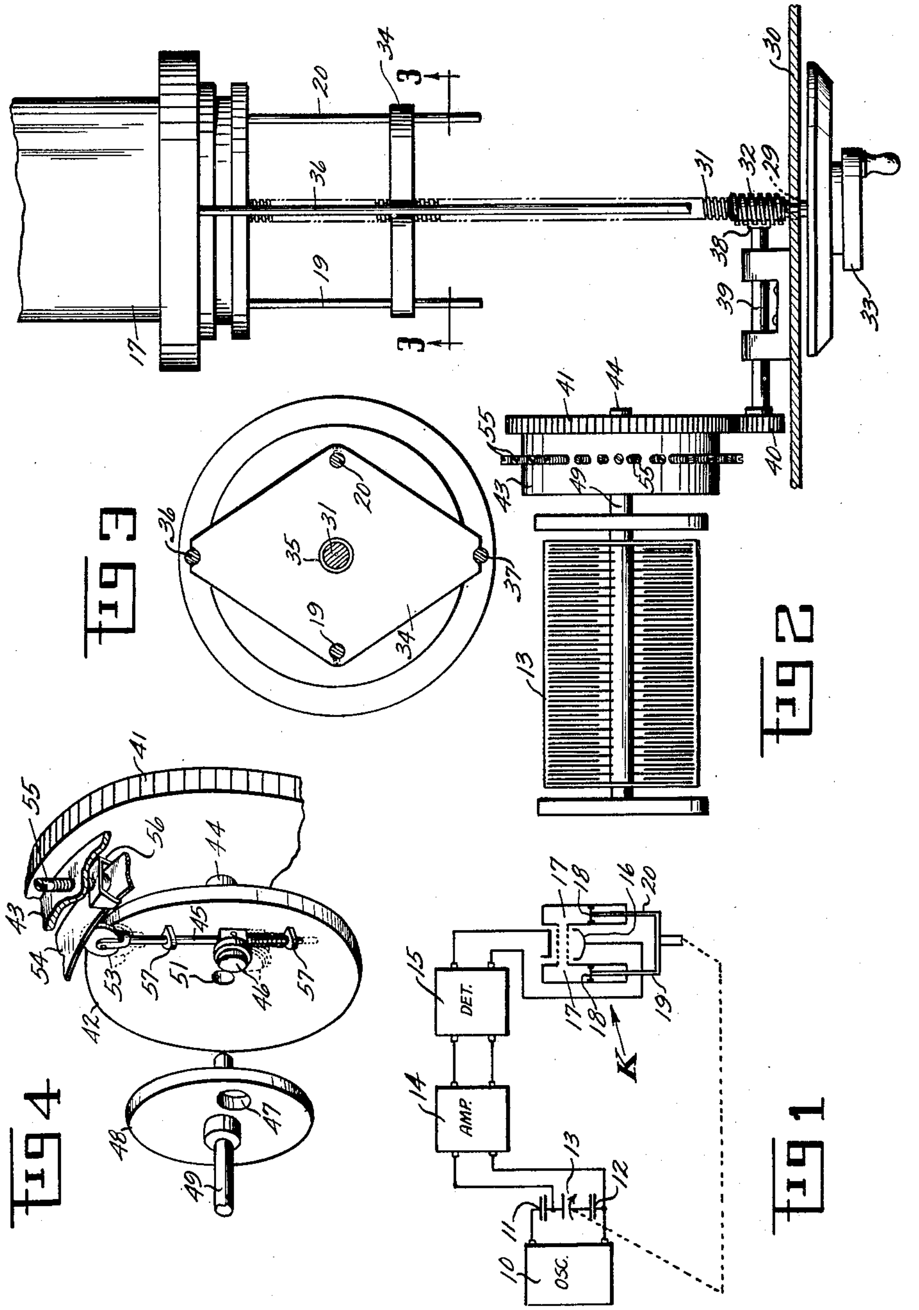
Fig. 1 is a block diagram of the electrical layout of my invention.
Fig. 2 illustrates a method for synchronizing the control of a reflex Klystron cavity resonator with a variable capacitor for varying the input voltage to the reflector.
Fig. 3 is a section taken along line 3—3 in Fig. 2.
Fig. 4 is an exploded view of a variable ratio transmission as used in my mechanism.

In Fig. 1, the output from a fixed frequency oscillator 10 is impressed across a capacity type voltage divider comprising fixed capacitors 11 and 12 and a variable capacitor 13. The portion of the output voltage developed across capacitors 12 and 13 is fed to an amplifier 14 and then to a detector stage 15. The direct current potential output of the detector stage 15 is then applied to a reflector 16 of a reflex Klystron K. The tube is surrounded by a coaxial type resonant cavity 17, and the cavity is tuned by a shorting ring 18. Plungers 19 and 20 move the shorting ring back and forth in the cavity and this motion is mechanically geared to the rotational movement of capacitor 13. As capacitor 13 is rotated, the amplitude of the voltage fed to amplifier 14 varies, and the output of the detector 15 is therefore a function of the rotational position of capacitor 13. By mechanically coupling the rotational motion of capacitor 13 to the motion of the cavity tuning plungers 19 and 20, it is possible to synchronize the tuning of the cavity resonator 17 and the potential on the reflector 16 over the entire band of oscillation of the Klystron tube. Thus, for any frequency of the resonant cavity 17, there will be a corresponding potential applied to the reflector 16. Through proper design, it is possible to obtain the exact necessary potential on reflector 16 for optimum oscillation at any desired frequency. This obviates the possibility of oscillation at a higher frequency mode and eliminates the need for checking the frequency with a wavemeter.

A means for mechanically gearing the rotational motion of capacitor 13 and the back and forth motion of resonant cavity plungers 19 and 20 is illustrated in Figs. 2, 3, and 4, wherein an aperture 29 through a panel 30 provides a bearing support for a threaded shaft 31 which has a worm 32 formed as an integral part thereof. A dial and crank handle assembly 33 is mounted on one end of shaft 31 on the outside face of the panel 30. Plunger rods 19 and 20 are fixed to a plate 34 which is threaded on shaft 31 through the internally threaded aperture 35. Guide rods 36 and 37 permit longitudinal motion of plate 34 but prevent rotation thereof. The worm 32 meshes with a worm gear 38 which is pinned to a shaft 39. A pinion 40 is also pinned to shaft 39 and meshes with a gear 41 which imparts rotational motion to the capacitor 13 through a variable ratio transmission which is inclosed in a casing 43.

The variable ratio transmission, as shown in Fig. 4, is of conventional design and comprises the gear 41 and a wheel 42 both of which are pinned to a shaft 44. A spring loaded rod 45 is eccentrically mounted for longitudinal sliding movement on the face of wheel 42 by means of the brackets 57 secured to wheel 42. A stud 46 fits loosely in a drive hole 47 provided in a wheel 48 and imparts rotational motion to a shaft 49 to which the wheel 48 is pinned and to which the rotor of the condenser 13 is secured. A concentric bore 51 in the wheel 42 provides a bearing support for shaft 49.

A roller 53 which is carried on one end of the rod 45 rides on a track or cam surface formed by a flexible band-like member 54. The member 54 is supported, at 15 degree intervals, from the casing 43 by adjustable screws 55 and clamps 56. By adjusting the screws 55 in or out, the cam surface forming member 54 may be made to vary from a true circle and is, in effect, a variable cam surface of predeterminable eccentricity. By suitable adjustment of screws 55 a lag or lead of rotational motion of wheel 48 with respect to rotation of gear 41 is effected for the purpose of synchronizing the potential on reflector 16 with the frequency of resonant cavity 17.

In operation, when dial and crank handle assembly 33 is turned manually, shaft 31 and worm 32 rotate. Longitudinal motion is thereby imparted to plate 34 and plunger rods 19 and 20. Thus, the electrical length of the coaxial resonant cavity is varied and its operating frequency determined. The worm 32 imparts simultaneous rotational movement to the capacitor 13 by means of the above-described gear train and variable ratio transmission. In this manner, the correct reflector potential is determined, and thus the proper operating conditions are set up for reflex Klystron operation with single dial control.

While this invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In combination, a vacuum tube having a reflector and a cathode, a source of variable potential applied between said reflector and said cathode, adjustably variable capacitor means inserted across said source of variable potential prior to its application between the tube reflector and cathode, a tunable cavity resonator part of said tube, and means modifying said cavity resonator and said source of potential in maintaining synchronization therebetween upon the tuning of said resonator.

2. In combination, a vacuum tube having a reflector, a source of variable potential applied to said reflector, a controlled variable condenser for varying the potential of said source and positioned thereacross, a cavity resonator part of said tube, a shorting ring movable back and forth inside said cavity resonator for tuning said cavity resonator to different frequencies, and means mechanically connecting said condenser and said ring for synchronizing the potential of said source with the frequencies of said cavity resonator when said cavity resonator is tuned to any frequency.

3. In combination, a vacuum tube having a reflector, a source of variable potential applied to said reflector, a variable condenser for varying the potential of said source by impressing a variable capacitance thereacross, a cavity resonator determining the frequency of said tube, a shorting ring movable back and forth inside said cavity resonator for tuning said cavity resonator to different frequencies, and an adjustable mechanism operatively interposed between said condenser and said ring for synchronizing the potential of said source with the frequency of said cavity resonator when said cavity resonator is tuned to any frequency.

4. In combination, a vacuum tube having a reflector, a source of variable potential applied to said reflector, a variable condenser having rotor plates and stator plates for varying the potential of said source by being connected thereacross, a cavity resonator substantially surrounding said tube, a shorting ring movable back and forth inside said cavity resonator for tuning said cavity resonator to different frequencies, and a control mechanism for moving said ring simultaneously with the adjustment of said variable condenser in synchronizing changes in input potential to said tube with frequency changes therein.

5. In combination, a vacuum tube having a reflector and a cathode, a source of variable potential applied across the tube by being connected to said reflector and to the cathode thereof, a variable condenser having rotor plates and stator plates for varying the potential of said source by being connected thereacross, a cavity resonator controlling the frequency of said tube, a shorting ring movable back and forth inside said cavity resonator for tuning said cavity resonator to different frequencies, a movable shaft plunger connected to said ring, means for moving said shaft plunger to adjust said ring and for simultaneously moving the condenser rotor plates in mutual synchronization of changes in frequency with changes in potential applied to said tube.

6. A device for tuning a reflex velocity modulated tube having cathode and repeller electrodes and operating at an adjustable frequency determined by a coaxial type of tunable resonant cavity part of the tube, comprising in combination a shorting ring adjustably disposed within said resonant cavity part of the tube for the tuning thereof, a plunger secured at one end to said shorting ring, a plate secured to said plunger and apertured centrally, a threaded shaft threading through the central aperture in said plate for the adjustment of said shorting ring by the rotation of said shaft, a variable capacitor adjusted in synchronization with the tuning of said resonant cavity part of said tube, a fixed frequency oscillator to which electrical energy is applied and having output leads across which said variable capacitor is connected, an amplifier connected across said variable capacitor, and a detector stage receiving its input from said amplifier and applying its output across said tube.

7. In combination, a single control device for tuning a reflex velocity modulated tube, comprising a cavity resonator having cathode and reflector elements and resonating in a band of frequencies upon the application of an electrical potential thereto, a source of electrical potential applied between the cathode and reflector elements of said resonator, variable capacitor means applied across said source of potential, and adjustable means simultaneously synchronizing the tuning of said cavity resonator with the adjustment of said variable capacitor.

8. In combination, a reflex velocity modulated tube tuning device, comprising a voltage source, a reflex velocity modulated tube powered from said voltage source, a variable capacitor connected across said voltage source, a resonant cavity means in said tube, cathode and reflector elements in said tube and between which said voltage source is applied and with which said capacitor is connected, and adjustable means simultaneously adjusting both said variable capacitor and said resonant cavity means.

EDWARD W. ERNST.

REFERENCES CITED

The following references are of record in the file of this patent:

UNITED STATES PATENTS

| Number | Name | Date |
|---|---|---|
| 2,294,942 | Varian | Sept. 8, 1942 |
| 2,410,063 | Hansen | Oct. 29, 1946 |
| 2,434,293 | Stearns | Jan. 13, 1948 |
| 2,450,026 | Tomlin | Sept. 28, 1948 |